United States Patent
Sanaullah et al.

(10) Patent No.: US 9,161,159 B2
(45) Date of Patent: Oct. 13, 2015

(54) SYSTEM AND METHOD FOR CONNECTING TO A PERIPHERAL DEVICE WITH ACCESS CREDENTIALS AND ROTATING PIN USING AN NFC REMOTE CONTROL

(71) Applicant: Dell Products L.P., Round Rock, TX (US)

(72) Inventors: Abu Shaher Sanaullah, Austin, TX (US); Karthikeyan Krishnakumar, Round Rock, TX (US); Claude Lano Cox, Austin, TX (US); Yuan-Chang Lo, Austin, TX (US); Raziuddin Ali, Austin, TX (US); Michael S. Gatson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 336 days.

(21) Appl. No.: 13/708,850

(22) Filed: Dec. 7, 2012

(65) Prior Publication Data

US 2014/0162549 A1 Jun. 12, 2014

(51) Int. Cl.
*H04B 5/00* (2006.01)
*H04W 4/00* (2009.01)
*H04B 7/00* (2006.01)

(52) U.S. Cl.
CPC ..................... *H04W 4/008* (2013.01)

(58) Field of Classification Search
CPC ........................................ H04W 4/008
USPC ................................ 455/41.1, 41.2
See application file for complete search history.

(56) References Cited

U.S. PATENT DOCUMENTS 8,037,511 B1 * 10/2011 Lundy et al. ............. 726/3

OTHER PUBLICATIONS

Apple Files for NFC Remote Control Patent for IPhone, Best Mobile Contracts, http://www.best-mobile-contracts.co.uk/news/2012/07/apple-files-for-nfc-remote-control, pp. 1-2, Jul. 27, 2012.

* cited by examiner

*Primary Examiner* — Eugene Yun
(74) *Attorney, Agent, or Firm* — Haynes and Boone, LLP

(57) ABSTRACT

A system and method for connecting to a peripheral device utilizes a near field communication ("NFC") enabled remote control to acquire a rotating access pin that is transmitted to an NFC enabled computing device in order to establish a connection between the computing device and the peripheral device.

20 Claims, 3 Drawing Sheets

SYSTEM AND METHOD FOR CONNECTING TO A PERIPHERAL DEVICE WITH ACCESS CREDENTIALS AND ROTATING PIN USING AN NFC REMOTE CONTROL

FIELD OF THE INVENTION

The present disclosure relates generally to peripheral device access methodologies, and more particularly to a system and method that utilizes a near field communication ("NFC") enabled remote control to establish a connection to a peripheral device having a rotating access pin number.

BACKGROUND

Some conventional peripheral devices utilize rotating access pins for security purposes. As understood in the art, a rotating access pin is a dynamic pin that randomly changes at some time interval or for a new communications session. For example, in addition to the credentials needed to connect to a wireless projector, a rotating access pin may be utilized to ensure that those attempting to connect with the projector are indeed present within the room. In such cases, the current access pin being utilized by the projector is visually displayed so that those within the room can enter the pin into their compute devices, thus allowing the establishment of the connection with the projector.

However, a problem arises when an NFC enabled remote control is used to connect a compute device with a peripheral that utilizes a rotating access pin. Since the pin dynamically changes over time, it cannot be stored within the remote control's static NFC tag. Therefore, much of the convenience provided by the NFC enabled remote is rendered useless.

Accordingly, there is a need in the art for a system that provides a solution to this problem, thus allowing the convenience of an NFC enabled remote and the security of a rotating access pin to be fully realized.

SUMMARY

The systems and methods described herein are directed to obtaining a connection between a compute device and a peripheral device utilizing a rotating access pin number. In certain exemplary embodiments, an NFC enabled remote control is positioned within close proximity to an NFC enabled compute device in order to establish an NFC communications link between the two. The access credentials of the peripheral device are stored in the NFC tag resident in the remote control. A request for the access credentials of the peripheral device is then transmitted from the compute device to the remote control over the NFC link. In response, the remote control transmits a request to the peripheral device for the current pin number of a rotating access pin number currently being used by the peripheral device. The current pin number is then transmitted by the peripheral device to the remote control, which then packets the current access pin number and other credentials (stored in the NFC tag) for transmission to the compute device. Once the access credentials packet is received by the compute device, the connection is established between the compute device and the peripheral device.

These and other embodiments and associated advantages will be readily apparent to those ordinarily skilled in the art having the benefit of this disclosure.

DETAILED DESCRIPTION

Illustrative embodiments and related methodologies of the present invention are described below as they might be employed in a system and method for connecting to a peripheral device using a rotating access pin number. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Figure 1:
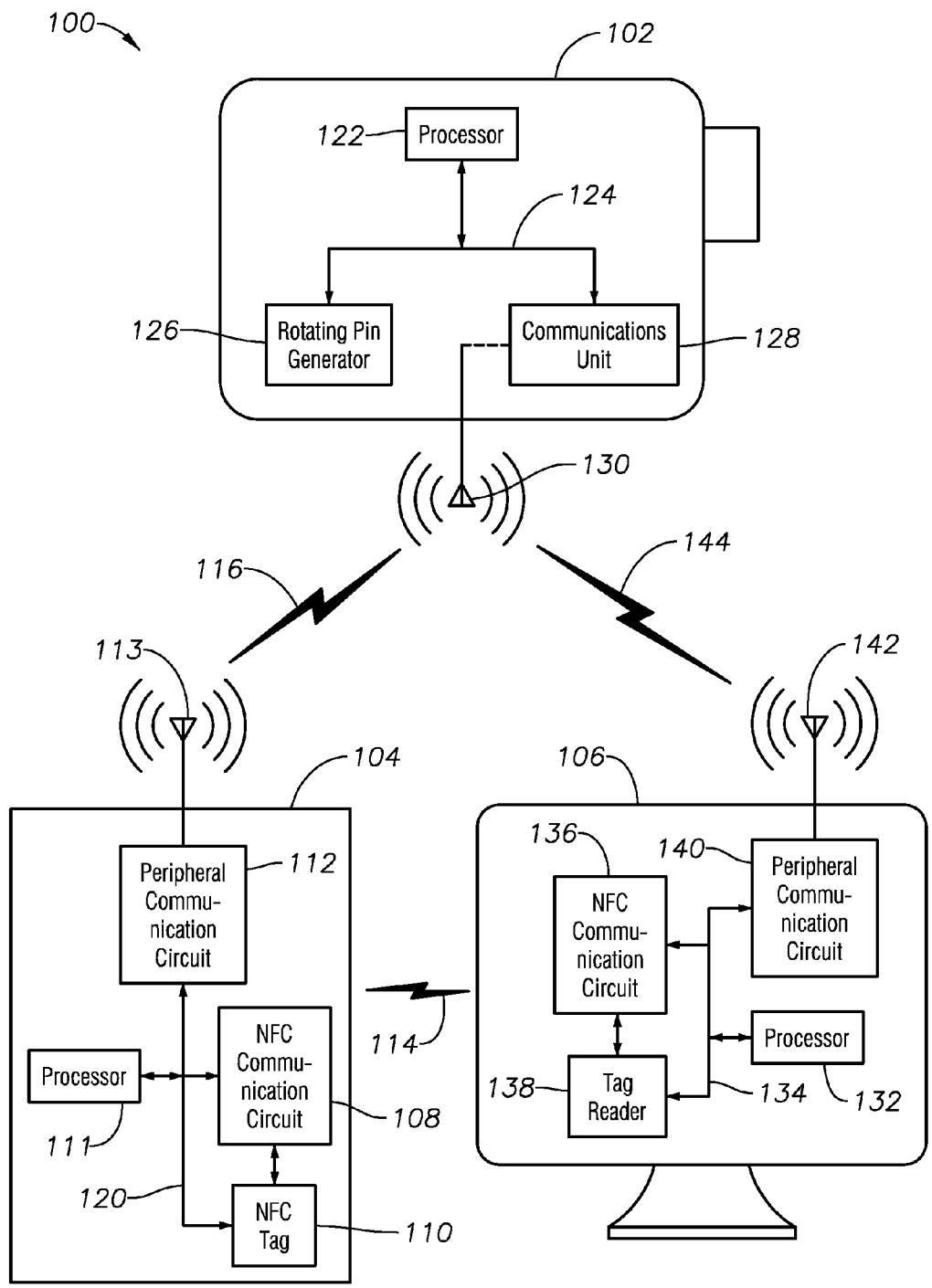
FIG. 1 illustrates a network architecture of a communication system according to certain exemplary embodiments of the present invention.

FIG. 1 illustrates the network architecture of a communication system 100 according to certain exemplary embodiments of the present invention. As described herein, communication system 100 utilizes an NFC enabled remote control that is configured to both (1) remotely control a peripheral device and to (2) establish a bi-directional communication link between the peripheral device and an NFC enabled compute device using a rotating access pin. In other words, the remote control is a trusted proxy for the peripheral device and, thus, has access to the access credentials of the peripheral device. Accordingly, the convenience of an NFC enabled remote control and the security of the rotating access are both realized.

As illustrated in FIG. 1, communication system 100 includes a peripheral device 102, remote control 104 and compute device 106. Peripheral device 102 may be, for example, a wireless projector, display monitor, television or video conferencing system. Compute device 106 may be, for example, any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, compute device 106 may be a personal computer, media tablet, a smartphone, or a consumer electronic device. Compute device 106 may further include memory, one or more processing resources such as a central processing unit (CPU) or hardware or software control logic. Additional components of compute device 106 may include one or more storage devices, one or more communications ports for communicating with external devices as well as various input and output (I/O) devices, such as a keyboard, a mouse, and a video display. Compute device 106 may also include one or more buses operable to transmit communications between the various hardware components.

In certain exemplary embodiments, remote control 104 is an NFC enabled infrared ("IR") or radio frequency ("RF")

remote controller. In other embodiments, remote controller 104 may be a device such as, for example, a PDA, cellphone or some other hand-held device. As understood in the art, NFC is a contactless high frequency short-range radio communications technology that allows data exchanges between devices over short distances, such as, for example, 4 centimeters or less. To achieve this functionality, remote control 104 comprises a processor 111 operably connected to a bus 120. Bus 120 serves as the connection between processor 111 and other components of remote control 104. Remote control 104 also includes an NFC tag 110 and NFC communications circuit 108 for communicating using an NFC communications protocol over NFC link 114. NFC communications circuit 108 amplifies, frequency converts, modulates and/or demodulates high-frequency signals transmitted to or received by remote controller 104, as understood in the art. Remote control 104 further includes a peripheral communications circuit 112 and antenna 113 to establish communications with peripheral device 102 over communications link 116. In like manner to NFC communications circuit 108, peripheral communications circuit 112 amplifies, frequency converts, modulates and/or demodulates signals to employ its respective transmission protocol. In certain exemplary embodiments, communications link 116 is a Bluetooth or RF communications link.

As will be understood by those ordinarily skilled in the art having the benefit of this disclosure, NFC tag 110 is utilized to establish NFC link 114 with compute device 106. The design and operation of NFC tags are well known in the art. As will be described herein, in some exemplary embodiments, NFC tag 110 may comprise a storage device comprising one or more access credentials of peripheral device 102. In other embodiments, NFC tag may be blank and the access credentials will be downloaded from peripheral device 102. In either embodiment, as will be described in more detail below, processor 111 utilizes NFC tag 110 to generate a data packet comprising the access credentials of peripheral device 110 and transmits the data packet over NFC link 114 via NFC communications circuit 108.

Although not shown, remote control 104 may also include an input device (keyboard, display, etc., for example) to provide input to processor 111. Programs and data may be stored on a mass storage device (not shown) which may be coupled to processor 111. Examples of mass storage devices may include, for example, solid-state storage devices and/or a variety other mass storage devices known in the art.

Still referring to FIG. 1, peripheral device 102 includes a processor 122 operably connected to bus 124. Peripheral device 102 further includes a rotating pin generator 126 that generates a rotating access pin number at some desired interval or at random. However, in other embodiments, the rotating access pin number may be generated by rotating pin generator 126 in response to a request for access credentials transmitted by remote controller 104. Nevertheless, once the access credentials request are received by peripheral device 104, processor 122, via rotating pin generator 126, generates a current access pin number from among the rotating pin numbers. Thereafter, processor 122 communicates the current access pin number to communications unit 128, which then transmits it remote control 104 over communications link 116 via antenna 130. As previously described, communications unit 128 amplifies, frequency converts, modulates and/or demodulates signals to employ its respective transmission protocol. Although not shown, peripheral device 102 may include various other circuitry to achieve its function, such as, for example, circuitry to provide audio/video projection in the case of a wireless projector.

As previously described, compute device 106 may take a variety of forms, such as, for example, a notebook computer. However, as shown in FIG. 1, compute device 106 includes a processor 132 operably coupled to a bus 134. As understood in the art, bus 134 allows processor 132 to effect system functions via communication with other system circuitry. Compute device 106 also includes NFC communication circuit 136 and NFC tag reader 138, both operably connected to bus 134 as well. As understood in the art, tag reader 138 is configured to detect the presence of NFC tag 110 of remote control 104. NFC communications circuit 136 amplifies, frequency converts, modulates and/or demodulates high-frequency signals transmitted to or received by compute device 106, as understood in the art. In this exemplary embodiment, tag reader 138 is integrated into compute device 106 as an integrated circuit. However, in other embodiments, tag reader 138 may be an external hardware device as will be understood by those ordinarily skilled in the art having the benefit of this disclosure.

NFC communications circuit 136 and NFC tag reader 138 allow processor 132 to establish communications with remote control 104 over NFC link 114 and transmit data accordingly. Compute device 106 also includes an antenna 142 and peripheral communications circuit 140 operably coupled to bus 134 to establish a connection with peripheral device 102 over communications link 144. In certain exemplary embodiments, communications link 144 is, for example, a Wi-Fi, Wi-Fi Direct or WiGig communications link. However, as will be understood by those ordinarily skilled in the art having the benefit of this disclosure, communications link 144, as well as the other communications links described herein, may be any variety of communications protocols. As will be described in more detail below, once NFC link 114 has been established, processor 132, via NFC communications circuit 136, transmits a request for the access credentials of peripheral device 102. Once the access credentials are received by compute device 106, processor 132 then utilizes the access credentials to establish a connection over communications link 144.

As previously described, remote controller 104 includes NFC tag 110 that stores one or more access credentials for peripheral device 102. In certain exemplary embodiments, the access credentials may be a current access pin number previously downloaded from peripheral device 102. In such embodiments, remote controller 104 will download other access credentials (service set identifiers, etc., for example) from peripheral device 102 over communications link 116. In other exemplary embodiments, however, the current access pin number for peripheral device is not stored within NFC tag 110; but rather, remote controller 104 will download the current access pin and other access credentials (service set identifier, for example) from peripheral device upon request from compute device 106. In yet other embodiments, NFC tag 110 will store the Wi-Fi service set identifier ("SSID") or other wireless networking link (144) access credentials and download the current access pin number from peripheral device 102. Those ordinarily skilled in the art will realize there are a variety of ways in which to retrieve and/or download one or more access credentials of peripheral device 102.

Figure 2:
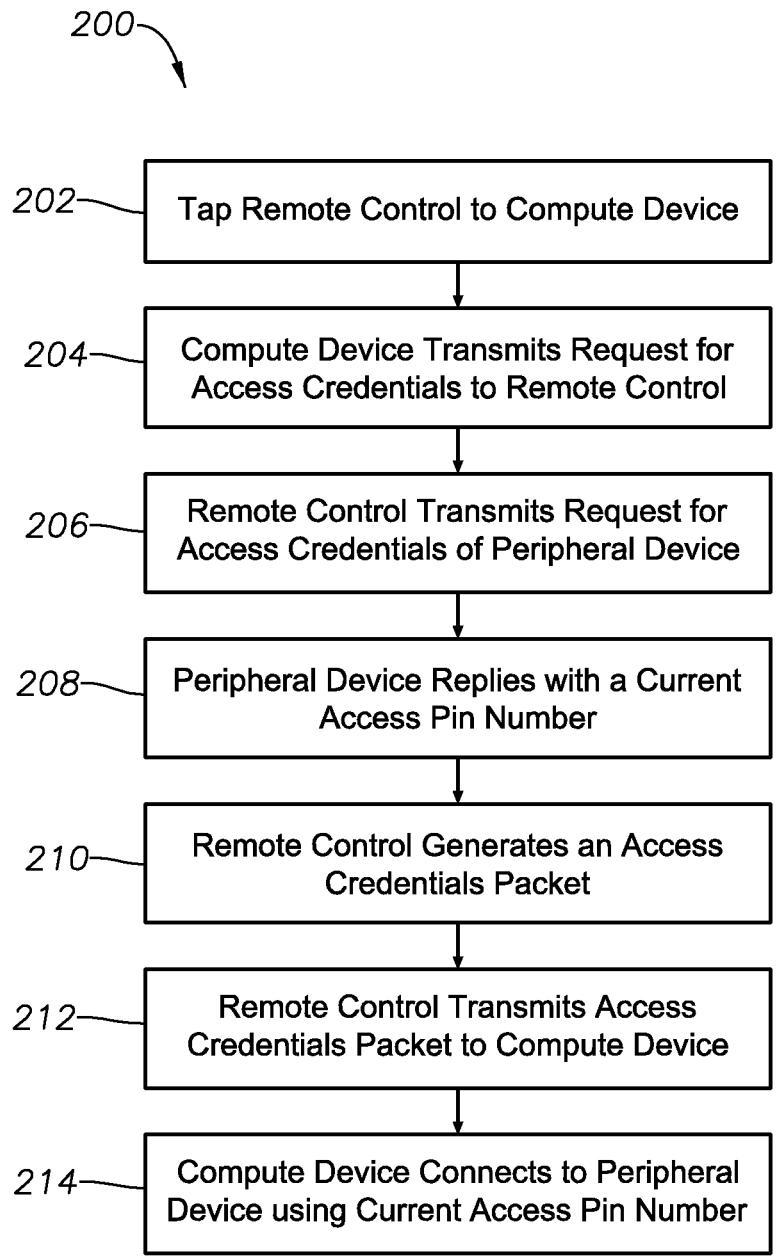
FIG. 2 is a flow chart of a method for connecting to a peripheral device using a rotating access pin number according to certain exemplary methodologies of the present invention.

FIG. 2 illustrates a method 200 for connecting to a peripheral device utilizing a rotating pin number according to certain exemplary methodologies of the present invention. With reference to FIGS. 1 and 2, at block 202, remote control 104 is positioned in proximity to compute device 106 where tag reader 138 detects the presence of NFC tag 110. In some embodiments, remote control 104 "taps" compute device 106, as understood in the art. However, in other embodiments, remote control 104 is brought within a certain distance (4 centimeters, for example) of compute device 106. Nevertheless, processors 111 and 132 then activate their respective NFC communication circuits 108, 136 in order to establish NFC link 114, as will be understood by those ordinarily skilled in the art having the benefit of this disclosure.

Once remote control 104 is brought into proximity with compute device 104, tag reader 138 detects its presence and, thereafter, processor 132 of compute device 104 initiates an application registered to receive NFC events and, at block 204, transmits a request over NFC link 114 for access credentials of peripheral device 102. The access credentials of peripheral device 102 may include, for example, the SSID, passphrase or current access pin number of peripheral device 102. At block 206, in certain embodiments, once the request for the access credentials is received, remote control 104 transmits a pin request for the current access pin number to peripheral device 102 over communications link 116. In certain exemplary embodiments, communications link 116 may be a Bluetooth communications link. At block 208, peripheral device 102 then retrieves or generates the current access pin number from rotating pin generator 126, and transmits it to remote control 104 over communications link 116.

In an alternative embodiment, however, at block 206, once the request for the access credentials is received by remote control 104, remote control 104 sends an access credentials request to peripheral device 102 for all the access information including, for example, the current access pin, passphrase and the SSID. In such an embodiment, the entire response transmitted by peripheral device 102 is constructed dynamically, and then transmitted over communications link 116 at block 208.

At block 210, remote control 104 then generates an access credentials packet that includes the current access pin number retrieved from peripheral device 102. As previously described, in certain embodiments, NFC tag 110 has stored thereon one or more additional access credentials of peripheral device 102 such as, for example, the Wi-Fi SSID, passphrase or other connection credentials of communications link 144 of peripheral device 102. In such embodiments, processor 111 retrieves the additional access credentials and combines them with the current access pin number within the generated access credentials packet. However, in alternate embodiments as previously described, remote control 104 downloads all the access credentials from peripheral device 102 and then generates the access credentials packet accordingly at block 210.

Nevertheless, at block 212, remote control 104 transmits the access credentials packet to compute device 106 over NFC link 114. At block 214, compute device 106 receives and decodes the access credentials packet, and then utilizes the access credentials to establish a connection with peripheral device 102 over communications link 144. In certain exemplary embodiments, communications link 144 is a Wi-Fi link.

Figure 3:
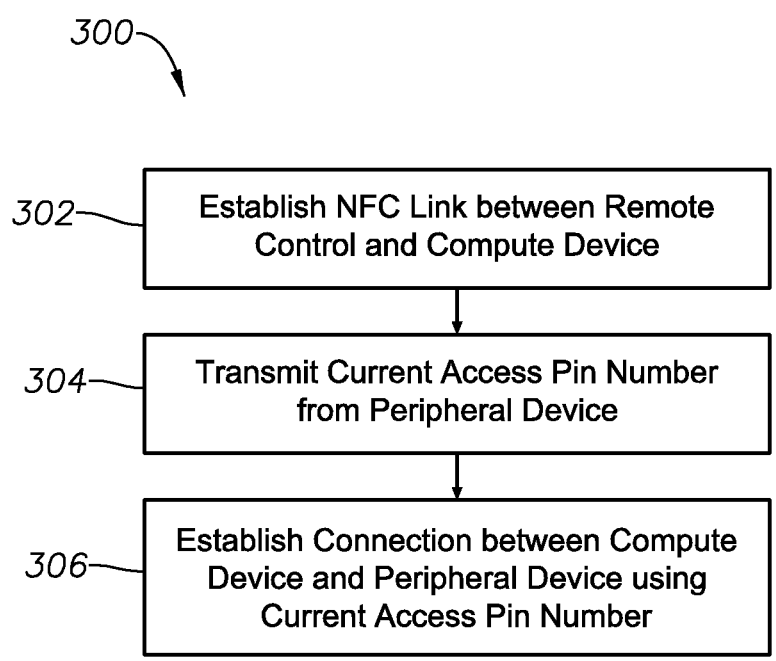
FIG. 3 is a flow chart of an alternative method for connecting to a peripheral device using a rotating access pin number according to certain exemplary methodologies of the present invention.

FIG. 3 illustrates an alternate method 300 for connecting to a peripheral device utilizing a rotating access pin number according to certain exemplary embodiments of the present invention. With reference to FIGS. 1 and 3, at block 302, remote control 104 is brought into sufficient proximity with compute device 106 to establish NFC link 114, as previously described. At block 304, peripheral device 102 then retrieves the current access pin number from rotating pin generator 126 and transmits it over communications link 116. In one methodology, for example, peripheral device 102 also transmits other access credentials such as, for example, the Wi-Fi SSID or passphrase for communications link 144. However, in other embodiments, the SSID, passphrase or other access credentials may be stored on remote control 104. At block 306, the current access pin number is utilized by compute device 102 to establish the connection with peripheral device 102 over communications link 144. To achieve this, remote control 104 transmits the current access pin (received from peripheral device 102) to compute device 106 over NFC link 114, as previously described herein.

Moreover, those ordinarily skilled in the art will realize there are a variety of alternate embodiments and advantages associated with the present invention. For example, remote control 104 may be configured to store the current access pin number of peripheral device 102. In such embodiments, remote control 104 may continuously poll peripheral device 102 for the current access pin number and/or other access credentials. Such a continuous polling may be conducted, for example, at a pre-determined time interval or upon depressing a button located on remote control 104. However, in alternative embodiments as described herein, remote control 104 will only request the access credentials of peripheral device 102 once a request has been received from compute device 106.

Accordingly, as described herein, the present invention provides the convenience of an NFC enabled remote controller in conjunction with the security of a rotating access pin number. An exemplary methodology of the present invention provides a method of connecting to a peripheral device utilizing a rotating access pin number, the method comprising positioning a remote control in proximity to a compute device to activate NFC circuits embodied in the remote control and compute device, establishing an NFC link between the remote control and the compute device, transmitting a request from the compute device to the remote control over the NFC link, the request being for access credentials of the peripheral device, transmitting an access credentials packet from the remote control to the compute device over the NFC link, the access credentials packet comprising a current access pin number of the rotating access pin number of the peripheral device, and establishing a connection between the compute device and the peripheral device over a second communications link utilizing the access credentials packet. In another method, the second communications link is one of a Wi-Fi, Wi-Fi Direct or WiGig communications link.

In yet another method, transmitting the access credentials packet from the remote control to the compute device further comprises transmitting a pin request from the remote control to the peripheral device over a third communications link, the pin request being for the current access pin number, transmitting the current access pin number from the peripheral device to the remote control over the third communications link, and generating the access credentials packet using the remote control, wherein the current access pin number forms part of the access credentials packet. In another, the third communications link is a Bluetooth or RF communications link. In yet another, generating the access credentials packet further comprises retrieving one or more additional access credentials of the peripheral device from an NFC tag embodied within the remote control. In another method, the access credentials packet further comprises an SSID.

In yet another method, transmitting the access credentials packet from the remote control to the compute device further comprises transmitting an access credentials request from the remote control to the peripheral device over a third communications link, the access credentials request being for the current access pin number and a SSID, transmitting the current access pin number and SSID from the peripheral device to the remote control over the third communications link, and generating the access credentials packet using the remote control, wherein the current access pin number and SSID form part of the access credentials packet.

An exemplary embodiment of the present invention provides a communication system for connecting to a peripheral device utilizing a rotating access pin number, the system comprising a peripheral device comprising a rotating access pin number, a remote control comprising a first NFC circuit and an NFC tag. The communication system also comprises a compute device comprising a second NFC circuit, wherein the first and second NFC circuits are configured to establish an NFC link between one another to transmit an access credentials packet from the remote control to the compute device, the access credentials packet comprising a current access pin number of the rotating access pin number of the peripheral device and an NFC tag reader configured to read the NFC tag of the remote control and a first peripheral communications circuit configured to establish a connection between the compute device and the peripheral device over a second communications link utilizing the access credentials packet. In another embodiment, the second communications link is a Wi-Fi, Wi-Fi Direct or WiGig communications link.

In yet another embodiment, the system further comprises a second peripheral communications circuit embedded within the remote control, the second peripheral communications circuit being configured to transmit a current access pin number request to the peripheral device over a third communications link, wherein the NFC tag of the remote control is further configured to generate the access credentials packet which comprises the current access pin number received from peripheral device. In another, the third communications link is a Bluetooth or RF communications link. In yet another, the access credentials packet further comprises one or more additional access credentials of the peripheral device stored within the NFC tag of the remote control. In another, the access credentials packet further comprises a SSID.

Yet another exemplary system further comprises a second peripheral communications circuit embedded within the remote control, the second peripheral communications circuit being configured to transmit a request for the current access pin number and a SSID to the peripheral device over a third communications link, wherein the NFC tag of the remote control is further configured to generate the access credentials packet which comprises the access pin number and the SSID received from peripheral device. In another, the peripheral device is a projector.

Yet another exemplary methodology of the present invention provides a method of connecting to a peripheral device utilizing a rotating access pin number, the method comprising establishing a first near field communications ("NFC") link between a remote control and a compute device, transmitting a current access pin number of the rotating access pin number from the peripheral device and establishing a connection between the peripheral device and the compute device using the current access pin number. In another, the current access pin number is transmitted from the peripheral device to the remote control over a second communications link. In yet another, establishing the connection between the peripheral device and the compute device further comprises transmitting the current access pin from the remote control to the compute device over the NFC link and establishing the connection between the peripheral device and the compute device over a third communications link. In another method, transmitting the current access pin number of the rotating access pin number from the peripheral device further comprises transmitting a SSID from the peripheral device. In yet another, transmitting a current access pin number of the rotating access pin number from the peripheral device further comprises retrieving a SSID from the remote control.

Although various embodiments and methodologies have been shown and described, the invention is not limited to such embodiments and methodologies and will be understood to include all modifications and variations as would be apparent to one ordinarily skilled in the art. For example, in some instances, some features of the embodiments may be employed without a corresponding use of other features. Therefore, it should be understood that the invention is not intended to be limited to the particular forms disclosed. Rather, the intention is to cover all modifications, equivalents and alternatives falling within the spirit and scope of the invention as defined by the appended claims.

What is claimed is:

1. A method of connecting to a peripheral device, comprising:
    positioning a remote control in proximity to a compute device and, in response, establishing a first wireless link directly between the remote control and the compute device;
    transmitting a request for access information for a peripheral device from the compute device to the remote control over the first wireless link;
    establishing a second wireless link directly between the remote control and the peripheral device;
    retrieving current access information by the remote control from the peripheral device over the second wireless link, wherein the current access information is provided by a dynamic access information generator in the peripheral device that is configured to generate different access information over time;
    transmitting the current access information from the remote control to the compute device over the first wireless link;
    establishing a third wireless link between the compute device and the peripheral device; and
    connecting to the peripheral device by the compute device using the current access information.

2. The method of claim 1, wherein the third wireless link is one of a Wi-Fi communications link, a Wi-Fi Direct communicatios link, and a WiGig wireless link.

3. The method of claim 1, wherein the dynamic access information generator is configured to generate the different access information over time according to at least one of a predetermined interval, at random, and in response to an access request.

4. The method of claim 1, wherein the second wireless link is one of Bluetooth wireless link and a Radio Frequency (RF) wirelss link.

5. The method of claim 1, further comprising:
    retrieving one or more additional access credentials for the peripheral device by the remote control from a memory device that is included in the remote control.

6. The method as defined in claim 5, wherein the one or more additional access credentials include a service set identifier.

7. The method as defined in claim 6, further comprising:
    generating an access credentials packet by the remote control, wherein the access credentials packet includes the current access information and the service set identifier; and
    transmitting the access credentials packet by the remote control directly to the compute device over the first wireless link.

8. A peripheral device connection system comprising:
a peripheral device that includes a peripheral device wireless communication system and a rotating access information generator that is configured to generator different access information at different times;
a remote control that includes a remote control wireless communication system and that is configured to:
  establish a first wireless link directly between the remote control wireless communication system and the peripheral device wireless communication system; and
  retrieve current access information generated by the rotating access information generator over the first wireless link; and
a compute device that includes a compute device wireless communication system and that is configured to:
  establish a second wireless link directly between the compute device wireless communication system and the remote control wireless communication system and, in response, request access information for the peripheral device over the second wireless link;
  retrieve the current access information over the second wireless link that was retrieved by the remote control from the rotating access information generator in the peripheral device; and
  establish a third wireless link between the compute device wireless communication system and the peripheral wireless communication system and, in response, connect to the peripheral device using the current access information.

9. The peripheral device connection system of claim 8, wherein the third wireless link is one of a Wi-Fi wireless link, a Wi-Fi Direct wireless link, and a WiGig wireless link.

10. The peripheral device connection system of claim 8, wherein the rotating access information generator is configured to generate the different access information at different times according to at least one of a predetermined interval, at random, and in response to an access request.

11. The peripheral device connection system of claim 8, wherein the first wireless link is one of a Bluetooth wireless link and a Radio Frequency (RF) wireless link.

12. The peripheral device connection system of claim 8, wherein the remote control includes a memory device and is configured to:
  retrieve one or more additional access credentials for the peripheral device from the memory device.

13. The peripheral device connection system of claim 8, wherein the one or more additional access credentials include a service set identifier.

14. The peripheral device connection system of claim 8, wherein the remote control is configured to:
  generate an access credentials packet, wherein the access credentials packet includes the current access information and the service set identifier; and
  transmit the access credentials packet to the compute device over the second wireless link.

15. The peripheral device connection system of claim 8, wherein the peripheral device includes a projector.

16. A method of providing for the connection to a peripheral device, comprising:
  establishing, by a remote control, a first wireless link directly with a compute device in response to being positioned adjacent the compute device;
  receiving, by the remote control over the first wireless link, a request for access information for a peripheral device from the compute device;
  establishing, by the remote control, a second wireless link directly with the peripheral device;
  retrieving, by the remote control over the second wireless link, current access information that is provided by a dynamic access information generator in the peripheral device that is configured to generate different access information over time;
  transmitting, by the remote control over the first wireless link, the current access information to the compute device, wherein the current access information is configured to provide for the connection by the compute device to the peripheral device over a third wireless link.

17. The method of claim 16, wherein the dynamic access information generator is configured to generate the different access information over time according to at least one of a predetermined interval, at random, and in response to an access request.

18. The method of claim 16, wherein the first wireless link is a Near Field Communication (NFC) wireless link and the second wireless link is one of a Bluetooth wireless link and a Radio Frequency (RF) wireless link.

19. The method of claim 16, further comprising:
  retrieving, by the remote control, one or more additional access credentials for the peripheral device from a memory device that is included in the remote control.

20. The method of claim 16, further comprising:
  generating, by the remote control, and access credentials packet that includes the current access information and the one or more additional access credentials; and
  transmitting, by the remote control over the second wireless link, the access credentials packet to the compute device.

* * * * *